United States Patent
Wei et al.

(10) Patent No.: US 12,188,814 B2
(45) Date of Patent: Jan. 7, 2025

(54) METHOD AND APPARATUS FOR DETECTING AMBIENT LIGHT UNDER DISPLAY SCREEN, AND ELECTRONIC DEVICE

(71) Applicant: SHENZHEN GOODIX TECHNOLOGY CO., LTD., Guangdong (CN)

(72) Inventors: Mingsong Wei, Guangdong (CN); Xiangyu Yang, Guangdong (CN); Luming Zhou, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 252 days.

(21) Appl. No.: 18/079,365

(22) Filed: Dec. 12, 2022

(65) Prior Publication Data

US 2023/0204413 A1 Jun. 29, 2023

(51) Int. Cl.
*G01J 1/42* (2006.01)

(52) U.S. Cl.
CPC .................................. *G01J 1/4204* (2013.01)

(58) Field of Classification Search
None
See application file for complete search history.

(56) References Cited

U.S. PATENT DOCUMENTS

| 8,933,916 | B1 | 1/2015 | Doar et al. |
| 9,622,326 | B1 | 4/2017 | Devyver et al. |
| 9,961,744 | B1 | 5/2018 | Doar et al. |
| 2007/0216637 | A1* | 9/2007 | Ito ........................ G09G 3/3406 345/102 |
| 2017/0110051 | A1* | 4/2017 | Gardner, Jr. ......... H05B 47/165 |
| 2021/0090523 | A1* | 3/2021 | Huang .................. G06F 3/0421 |
| 2021/0127471 | A1* | 4/2021 | Wang .................... H05B 47/11 |
| 2021/0210027 | A1* | 7/2021 | Chen .................... G09G 3/3406 |
| 2021/0312853 | A1* | 10/2021 | Sin ....................... G09G 3/3233 |

(Continued)

FOREIGN PATENT DOCUMENTS

| CN | 103052218 A | 4/2013 |
| CN | 107917755 A | 4/2018 |

(Continued)

*Primary Examiner* — Jonathan M Hansen
*Assistant Examiner* — Jarreas Underwood
(74) *Attorney, Agent, or Firm* — Scully, Scott, Murphy & Presser, P.C.

(57) ABSTRACT

The present application provides a method, apparatus, and electronic device for detecting ambient light under a display screen, which could reduce the influence of a light leak from a screen on detection of the ambient light. The method includes: generating an interval identification signal for screen light of the display screen according to a dimming period of the display screen, the interval identification signal being used to identify the screen light that is within a specific time interval in the dimming period; performing data collection according to a sampling signal; reading data of a target sampling period from data of a plurality of sampling periods of the sampling signal according to the interval identification signal, the target sampling period being a sampling period in which sampling time overlaps with the specific time interval in time; and detecting the ambient light according to the data of the target sampling period.

17 Claims, 8 Drawing Sheets

(56) References Cited

U.S. PATENT DOCUMENTS

2021/0319753 A1* 10/2021 Kelly ................... G09G 3/3233
2022/0262304 A1* 8/2022 Fan ..................... G09G 3/2018

FOREIGN PATENT DOCUMENTS

| CN | 107979698 A | 5/2018 |
| CN | 112187391 A | 1/2021 |
| CN | 112242119 A | 1/2021 |
| CN | 112710388 A | 4/2021 |
| CN | 112714205 A | 4/2021 |
| CN | 112985588 A | 6/2021 |
| CN | 113077738 A | 7/2021 |
| CN | 113096614 A | 7/2021 |
| JP | 2008096805 A | 4/2008 |
| JP | 2009058342 A | 3/2009 |
| JP | 2013120991 A | 6/2013 |
| WO | 2020025760 A1 | 2/2020 |

* cited by examiner

100

| Generating an interval identification signal for screen light of a display screen according to a dimming period of the display screen, the interval identification signal being used to identify the screen light that is within a specific time interval in the dimming period | — 110 |

| Performing data collection according to a sampling signal | — 120 |

| Reading data of a target sampling period from data of a plurality of sampling periods of the sampling signal according to the interval identification signal, the target sampling period being a sampling period in which sampling time overlaps with the specific time interval in time | — 130 |

| Detecting ambient light according to the data of the target sampling period | — 140 |

FIG. 1

METHOD AND APPARATUS FOR DETECTING AMBIENT LIGHT UNDER DISPLAY SCREEN, AND ELECTRONIC DEVICE

CROSS-REFERENCE TO RELATED APPLICATIONS

This application claims priority to Chinese Patent Application No. 202111618420.2, filed on Dec. 27, 2021, which is hereby incorporated by reference in its entirety.

TECHNICAL FIELD

Embodiments of the present application relate to the field of ambient light detection, and more particularly, to a method and apparatus for detecting ambient light under a display screen, and electronic device.

BACKGROUND

An ambient light sensor is configured to detect illumination intensity, color temperature or the like of ambient light of an electronic device, so that the electronic device can implement functions such as self-adjustment of screen brightness based on the change of the ambient light. In order to meet a demand of a high screen proportion, a sensor originally disposed on the front of a screen is moved under the screen, such as a fingerprint sensor and an ambient light sensor. The ambient light sensor disposed under the screen can detect not only ambient light but also a light leak from the screen. As an interference signal, the light leak from the screen affects the detection of the ambient light. Therefore, how to reduce the influence of a light leak from a screen on detection of ambient light has become an urgent problem to be solved.

SUMMARY

Embodiments of the present application provide a method, apparatus, and electronic device for detecting ambient light under a display screen, which could reduce the influence of a light leak from the screen on detection of the ambient light.

In a first aspect, a method for detecting ambient light under a display screen is provided, where the method includes: generating an interval identification signal for screen light of the display screen according to a dimming period of the display screen, the interval identification signal being used to identify the screen light that is within a specific time interval in the dimming period; performing data collection according to a sampling signal; reading data of a target sampling period from data of a plurality of sampling periods of the sampling signal according to the interval identification signal, the target sampling period being a sampling period in which sampling time overlaps with the specific time interval in time; and detecting the ambient light according to the data of the target sampling period.

Based on this technical solution, part of screen light of a display screen that is within a specific time interval in a dimming period of the display screen is identified through an interval identification signal, thus, a target sampling period in which data corresponding to the specific time interval can be collected is determined from a plurality of sampling periods, and the data of the target sampling period is read for detection of ambient light.

In a possible implementation manner, the dimming period includes a falling interval and a non-falling interval, and the specific time interval is a time interval during which a signal amount of the screen light is minimum within the falling period.

The display screen emits the screen light based on its dimming period, the dimming period includes a falling period and a non-falling period, the display screen is on in the non-falling period, and the display screen is off in the falling period. When an ambient light sensor detects the ambient light, it is affected by the screen light. When the specific time interval is a time interval during which a signal amount is minimum in the falling period, interference caused by the screen light is minimum, and data collected at this time is closest to data of the ambient light. Based on the data in the target sampling period, the ambient light can be detected relatively more accurately.

There may be a small amount of screen light even in the falling period, so as to affect the detection of the ambient light, that is, the data of the target sampling period is ambient light data that is least affected by the interference of a light leak from the screen. However, in some cases, for example, in a case of low brightness of the screen, the data of the target sampling period can be determined as the data of the ambient light under a condition of an allowed error, so as to simplify the test process.

In a possible implementation manner, the method further includes: adjusting a start time of the sampling signal according to data of a preceding sampling period of the target sampling period and data of a following sampling period of the target sampling period, to reduce the data of the target sampling period to a minimum.

Sampling time in a sampling period has a certain width, and when the sampling time is slightly advanced or slightly delayed, the size of the data in the sampling time may be changed slightly. In order to collect data when the screen light is minimum, a start time of the sampling signal can be adjusted, so that the data collected in the target sampling period is minimum.

In a possible implementation manner, the adjusting the start time of the sampling signal according to the data of the preceding sampling period of the target sampling period and the data of the following sampling period of the target sampling period, includes: reading the data of the preceding sampling period and the data of the following sampling period; delaying the start time of the sampling signal according to a preset adjustment amount when the data of the preceding sampling period is greater than the data of the following sampling period; and advancing the start time of the sampling signal according to the adjustment amount when the data of the following sampling period is greater than the data of the preceding sampling period.

In this embodiment, through the sizes of data in the preceding sampling period and the following sampling period of the target sampling period, whether the start time of the sampling signal needs to be adjusted can be determined. When the data of the preceding sampling period is greater than the data of the following sampling period, the start time of the sampling signal can be delayed according to a certain adjustment amount, so that the target sampling period contains less data of the light leak from the screen; and when the data of the following sampling period is greater than the data of the preceding sampling period, the start time of the sampling signal can be advanced according to the adjustment amount, so that the target sampling period contains less data of the light leak from the screen.

For example, the adjustment amount is:

$\Delta T = \{[(\frac{1}{2}) \times |Data\_Pre - Data\_Aft|]/(Data\_Pre + Data\_Aft)\} \times T$, where $\Delta T$ is the adjustment amount, Data_Pre is the data of the preceding sampling period, Data_Aft is the data of the following sampling period, and T is sampling time in a sampling period or a preceding adjustment amount.

In a possible implementation manner, the method further includes: adjusting a start time of the sampling signal according to a preset time step, to reduce the data of the target sampling period to a minimum.

In this embodiment, a start time of the sampling signal can be adjusted directly according to a preset time step, instead of relying on the data in the preceding sampling period and the following sampling period of the target sampling period, until the data of the target sampling period is minimum.

In a possible implementation manner, the method further includes: monitoring frequency deviation of the display screen; reading a vertical synchronizing signal for the display screen when a degree of the frequency deviation is greater than a preset value; and adjusting a start time and/or a sampling period of the sampling signal according to the vertical synchronizing signal.

When frequency deviation occurs on the display screen, the position and width of the falling interval may be changed, and the position of the sampling signal needs to be adjusted. There is a fixed time delay between the start time of the sampling signal and a vertical synchronizing signal for the display screen. Therefore, the vertical synchronizing signal for the display screen is read, and the start time of the sampling signal is adjusted based on the vertical synchronizing signal, to reduce the influence of the frequency deviation on the detection of the ambient light.

In a possible implementation manner, brightness of the screen light includes a plurality of brightness levels, the plurality of brightness levels correspond to a plurality of interval identification signals, respectively, and the generating the interval identification signal for the screen light of the display screen, includes: generating the interval identification signal corresponding to a current brightness level of the display screen.

When screen brightness of the display screen is different, the position and width of the falling interval may be changed. Therefore, a plurality of interval identification signals can be set for different brightness levels. When an interval identification signal for the screen light of the display screen is generated, the interval identification signal is an interval identification signal corresponding to current brightness of the display screen.

In a second aspect, a method for detecting ambient light under a display screen is provided, and the method includes: generating an interval identification signal for screen light of the display screen according to a dimming period of the display screen, the interval identification signal being used to identify the screen light that is within a specific time interval in the dimming period; determining a sampling signal according to the interval identification signal, there is an integer multiple relationship between a sampling period of the sampling signal and a period of the interval identification signal; performing data collection according to the sampling signal; reading data of a target sampling period from data of a plurality of sampling periods of the sampling signal, the target sampling period being a sampling period in which sampling time overlaps with the specific time interval in time; and detecting the ambient light according to the data of the target sampling period.

Based on this technical solution, part of screen light of a display screen that is within a specific time interval in a dimming period of the display screen is identified through an interval identification signal, and thus a sampling signal is determined according to the interval identification signal, so that there is an integer multiple relationship between a sampling period of the sampling signal and a period of the interval identification signal. In this way, when data corresponding to one specific time interval can be collected, data corresponding to another specific time interval can also be collected, and thus data corresponding to each specific time interval can be fully utilized for detection of the ambient light.

In a possible implementation manner, the target sampling period is distributed periodically.

Since there is an integer multiple relationship between the sampling period of the sampling signal and the period of the interval identification signal, the target sampling period in which data corresponding to the specific time interval can be collected is distributed periodically.

In a possible implementation manner, the dimming period includes a falling interval and a non-falling interval, and the specific time interval is a time interval during which a signal amount of the screen light is minimum within the falling interval.

The display screen emits the screen light based on its dimming period, the dimming period includes a falling interval and a non-falling interval, the display screen is on in the non-falling interval, and the display screen is off in the falling interval. When an ambient light sensor detects the ambient light, it is affected by the screen light. When the specific time interval is a time interval during which a signal amount is minimum in the falling interval, interference caused by the screen light is minimum, and data collected at this time is closest to data of the ambient light. Based on the data in the target sampling period, the ambient light can be detected more accurately.

In a possible implementation manner, the detecting the ambient light according to the data of the target sampling period, includes: determining the data of the target sampling period as data of the ambient light.

There may be a small amount of screen light even in the falling interval, so as to affect the detection of the ambient light, that is, the data of the target sampling period is ambient light data that is least affected by the interference of a light leak from the screen. However, in some cases, for example, in a case of low brightness of the screen, the data of the target sampling period can be determined as the data of the ambient light under a condition of an allowed error, so as to simplify the test process.

In a possible implementation manner, the method further includes: adjusting a start time of the sampling signal according to data of a preceding sampling period of the target sampling period and data of a following sampling period of the target sampling period, to reduce the data of the target sampling period to a minimum.

Sampling time in a sampling period has a certain time width, and when the sampling time is slightly advanced or slightly delayed, the size of the data in the sampling time may be changed slightly. In order to collect data when the screen light is minimum, a start time of the sampling signal can be adjusted, so that the data collected in the target sampling period is minimum.

In a possible implementation manner, the adjusting the start time of the sampling signal according to the data of the preceding sampling period of the target sampling period and the data of the following sampling period of the target sampling period, includes: reading the data of the preceding sampling period and the data of the following sampling period; delaying the start time of the sampling signal according to a preset adjustment amount when the data of the preceding sampling period is greater than the data of the following sampling period; and advancing the start time of the sampling signal according to the adjustment amount when the data of the following sampling period is greater than the data of the preceding sampling period.

In this embodiment, through the sizes of data in the preceding sampling period and the following sampling period of the target sampling period, whether the start time of the sampling signal needs to be adjusted can be determined. When the data of the preceding sampling period is greater than the data of the following sampling period, the start time of the sampling signal can be delayed according to a certain adjustment amount, so that the target sampling period contains less data of the light leak from the screen; and when the data of the following sampling period is greater than the data of the preceding sampling period, the start time of the sampling signal can be advanced according to the adjustment amount, so that the target sampling period contains less data of the light leak from the screen.

For example, the adjustment amount is:

$\Delta T = \{[(\frac{1}{2}) \times |Data\_Pre - Data\_Aft|]/(Data\_Pre + Data\_Aft)\} \times T$, where $\Delta T$ is the adjustment amount, Data_Pre is the data of the preceding sampling period, Data_Aft is the data of the following sampling period, and T is sampling time in a sampling period or a preceding adjustment amount.

In a possible implementation manner, the method further includes: adjusting a start time of the sampling signal according to a preset time step, to reduce the data of the target sampling period to a minimum.

In this embodiment, a start time of the sampling signal can be adjusted directly according to a preset time step, instead of relying on the data in the preceding sampling period and the following sampling period of the target sampling period, until the data of the target sampling period is minimum.

In a possible implementation manner, the method further includes: monitoring frequency deviation of the display screen; reading a vertical synchronizing signal for the display screen when a degree of the frequency deviation is greater than a preset value; and adjusting a start time and/or a sampling period of the sampling signal according to the vertical synchronizing signal.

When frequency deviation occurs on the display screen, the position and width of the falling interval may be changed, and the position of the sampling signal needs to be adjusted. There is a fixed time delay between the start time of the sampling signal and a vertical synchronizing signal for the display screen. Therefore, the vertical synchronizing signal for the display screen is read, and the start time of the sampling signal is adjusted based on the vertical synchronizing signal, to reduce the influence of the frequency deviation on the detection of the ambient light.

In a possible implementation manner, brightness of the screen light includes a plurality of brightness levels, the plurality of brightness levels correspond to a plurality of interval identification signals, respectively, and the generating the interval identification signal for the screen light of the display screen, includes: generating the interval identification signal corresponding to a current brightness level of the display screen.

When screen brightness of the display screen is different, the position and width of the falling interval may be changed. Therefore, a plurality of interval identification signals can be set for different brightness levels. When an interval identification signal for the screen light of the display screen is generated, the interval identification signal is an interval identification signal corresponding to current brightness of the display screen.

In a third aspect, an apparatus for detecting ambient light under a display screen is provided, and the apparatus includes: a sensor, configured to perform data collection according to a sampling signal; and a processor, configured to: generate an interval identification signal for screen light of the display screen according to a dimming period of the display screen, the interval identification signal being used to identify part of the screen light that is within a specific time interval in the dimming period; read data of a target sampling period from data of a plurality of sampling periods of the sampling signal according to the interval identification signal, the target sampling period being a sampling period in which sampling time overlaps with the specific time interval in time; and detect the ambient light according to the data of the target sampling period.

In a possible implementation manner, the dimming period includes a falling interval and a non-falling interval, and the specific time interval is a time interval during which a signal amount of the screen light is minimum within the falling interval.

In a fourth aspect, an apparatus for detecting ambient light under a display screen is provided, and the apparatus includes: a sensor, configured to perform data collection according to a sampling signal; and a processor, configured to: generate an interval identification signal for screen light of the display screen according to a dimming period of the display screen, the interval identification signal being used to identify part of the screen light that is within a specific time interval in the dimming period; determine the sampling signal according to the interval identification signal, there is an integer multiple relationship between a sampling period of the sampling signal and a period of the interval identification signal; read data of a target sampling period from data of a plurality of sampling periods of the sampling signal, the target sampling period being a sampling period in which sampling time overlaps with the specific time interval in time; and detect the ambient light according to the data of the target sampling period.

In a possible implementation manner, the target sampling period is distributed periodically.

In a possible implementation manner, the dimming period includes a falling interval and a non-falling interval, and the specific time interval is a time interval during which a signal amount of the screen light is minimum within the falling interval.

In a fifth aspect, an electronic device is provided, including: a display screen; and the apparatus for detecting ambient light under the display screen in the third aspect or any possible implementation manner of the third aspect.

In a sixth aspect, an electronic device is provided, including: a display screen; and the apparatus for detecting ambient light under the display screen in the fourth aspect or any possible implementation manner of the fourth aspect.

BRIEF DESCRIPTION OF DRAWINGS

FIG. 1 is a schematic flowchart of a method for detecting ambient light according to an embodiment of the present application.

DESCRIPTION OF EMBODIMENTS

Figure 2:
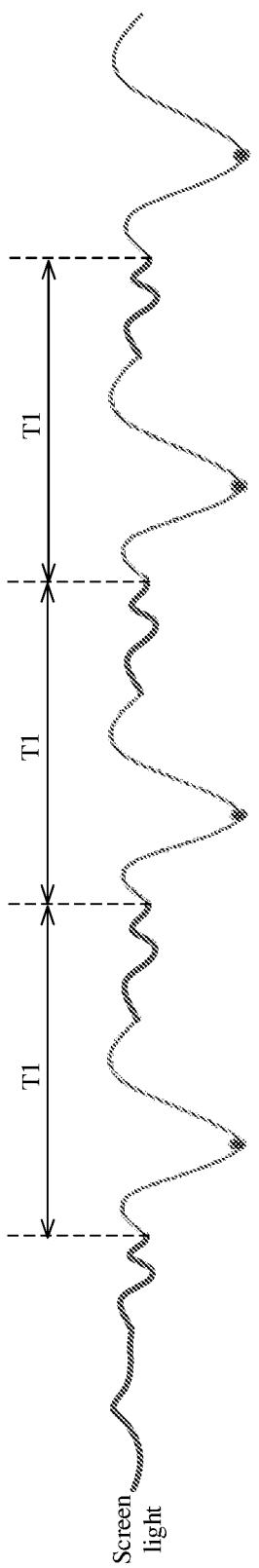
FIG. 2 is a schematic diagram of a dimming process of a display screen.

Technical solutions in the present application will be described hereinafter with reference to accompanying drawings An ambient light sensor is configured to detect illumination intensity, color temperature or the like of ambient light of an electronic device, so that the electronic device can implement functions such as self-adjustment of screen brightness based on the change of the ambient light. In order to meet a demand of a high screen proportion, the ambient light sensor can be disposed under a display screen. However, a light leak from the screen would affect the detection of the ambient light.

Generally, the display screen emits screen light based on its dimming period, and the dimming manner may be pulse width modulation (PWM) dimming, for example. The dimming period includes a falling interval and a non-falling interval, the display screen is on in the non-falling interval, and the display screen is off in the falling interval. When the on and off states of the display screen alternate quickly enough, through the naked eyes, the person would think that the display screen is always on. Since the light leak from the display screen is minimum in the falling interval, the interference of the light leak from the screen to the detection of the ambient light is minimum when the detection of the ambient light is performed in the falling interval.

For this reason, the present application provides a method for detecting ambient light under a display screen, which could accurately locate a time interval during which the interference of a light leak from the screen is minimum, and perform ambient light detection on data collected in this time interval using a sensor.

FIG. 1 shows a schematic flowchart of a method for detecting ambient light in an embodiment of the present application. As shown in FIG. 1, a method 100 for detecting ambient light includes some or all of the following steps.

In step 110, an interval identification signal for screen light of a display screen is generated according a dimming period of the display screen.

The interval identification signal is used to identify the screen light that is within a specific time interval in the dimming period. The interval identification signal can identify a time position of the specific time interval, and optionally, can identify information such as a size of the screen light within the specific time interval.

In step 120, data collection is performed according to a sampling signal.

In step 130, data of a target sampling period is read from data of a plurality of sampling periods of the sampling signal according to the interval identification signal.

The target sampling period is a sampling period in which sampling time overlaps with the specific time interval in time.

That is, when data is collected according to the sampling signal based on a preset sampling period and the sampling period just overlaps with the specific time interval identified by interval identification information in time, it means that the data collected in the sampling period is data corresponding to the specific time interval, and then the sampling period is a target sampling period. The data of the target sampling period can be read out for detection of the ambient light.

The term "overlap" here may refer to either full overlapping or partial overlapping.

In step 140, the ambient light is detected according to the data of the target sampling period.

It can be seen that part of screen light of a display screen that is within a specific time interval in a dimming period of the display screen is identified through an interval identification signal, thus, a target sampling period in which data corresponding to the specific time interval can be collected is determined from a plurality of sampling periods, and the data of the target sampling period is read for detection of ambient light.

The display screen emits the screen light based on its dimming period, the dimming period includes a falling interval and a non-falling interval, the display screen is on in the non-falling interval, and the display screen is off in the falling interval. When an ambient light sensor detects the ambient light, it is affected by the screen light. Optionally, when the specific time interval is a time interval during which a signal amount is minimum in the falling interval, interference caused by the screen light is minimum, and data collected at this time is closest to data of the ambient light. Therefore, based on the data in the target sampling period, the ambient light can be detected more accurately.

It should be understood that there may be a small amount of screen light even in the falling interval, so as to affect the detection of the ambient light, that is, the data of the target sampling period is ambient light data that is least affected by the interference of a light leak from the screen. However, in some cases, for example, in a case of low brightness of the screen, the data of the target sampling period can be regarded as the data of the ambient light under a condition of an allowed error, so as to simplify the test process. For example, in step 140, the data of the target sampling period can be determined as data of the ambient light.

Figure 3:
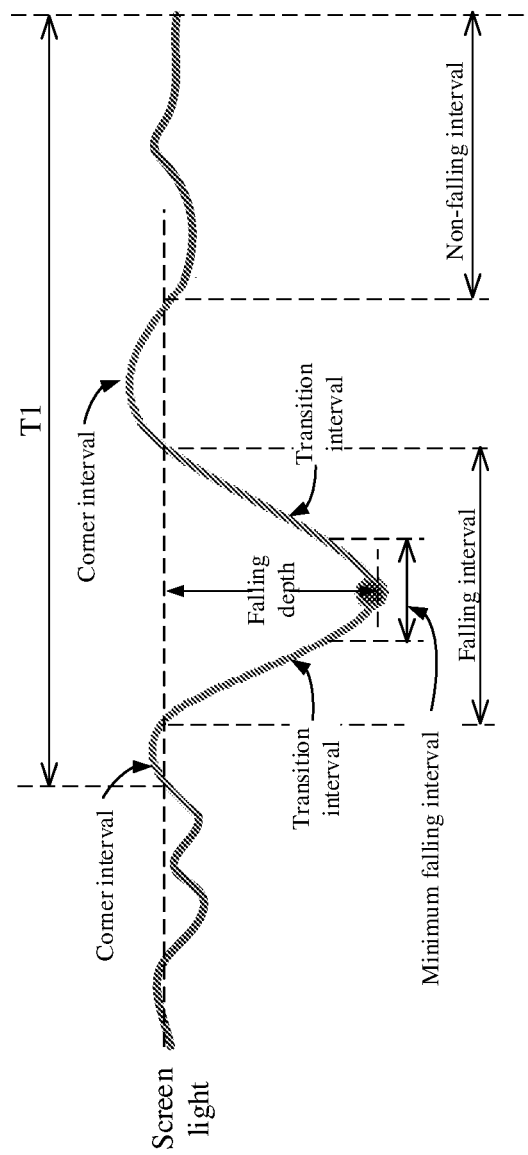
FIG. 3 is a schematic diagram of division of various time intervals in a dimming period according to an embodiment of the present application.

In the embodiments of the present application, the specific time interval may be another time interval in the dimming period in addition to the time interval during which the signal amount of the screen light is minimum in the falling interval. FIG. 2 shows a dimming process of a display screen, in which the display screen emits screen light at a dimming period T1. Each dimming period T1 includes a plurality of time intervals. For example, as shown in FIG. 3, the dimming period T1 includes a falling interval (Blank), a non-falling interval (Non Blank), and a corner interval (Corner) located between the falling interval and the non-falling interval. In the falling interval, the signal amount of the screen light of the display screen gradually drops or rises, a time interval during which the signal amount is minimum in the falling interval is referred to as a minimum falling interval (Blank Min), and a time interval corresponding to the drop or rise process of the signal amount is referred to as a transition interval (Transition). The difference between the signal amount of the falling interval and that of the non-falling interval is referred to a falling depth.

The specific time interval is, for example, a minimum falling interval, and thus the ambient light is detected according to the data of the target sampling period. In this case, it can be considered that the data of the target sampling period does not basically include data of the light leak from the screen, thereby greatly reducing the interference caused by the light leak from the screen in the process of detecting the ambient light.

The specific time interval may also be, for example, a time interval such as a falling interval, a non-falling interval, a corner interval, or a transition interval. Correspondingly, the interval identification signal may identify the positions of these time intervals. Further, the falling depth may also be identified. It should be understood that there is screen light in all of these time intervals, the data of the corresponding target sampling period includes both the data of the ambient light and the data of the light leak from the screen, and thus the data of the corresponding target sampling period is not directly used as the data of the ambient light. However, after identifying these time intervals and obtaining the data corresponding to them, the light leak from the screen can be estimated based on a certain algorithm, so as to better calibrate the detection result of the ambient light to improve accuracy of the detection of the ambient light. For example, according to the estimated light leak from the screen in the minimum falling interval, the influence of the light leak from the screen can be removed from the data collected in the minimum falling interval, to improve accuracy of the detection.

The following will be described by an example that the specific time interval is a minimum falling interval.

Figure 4:
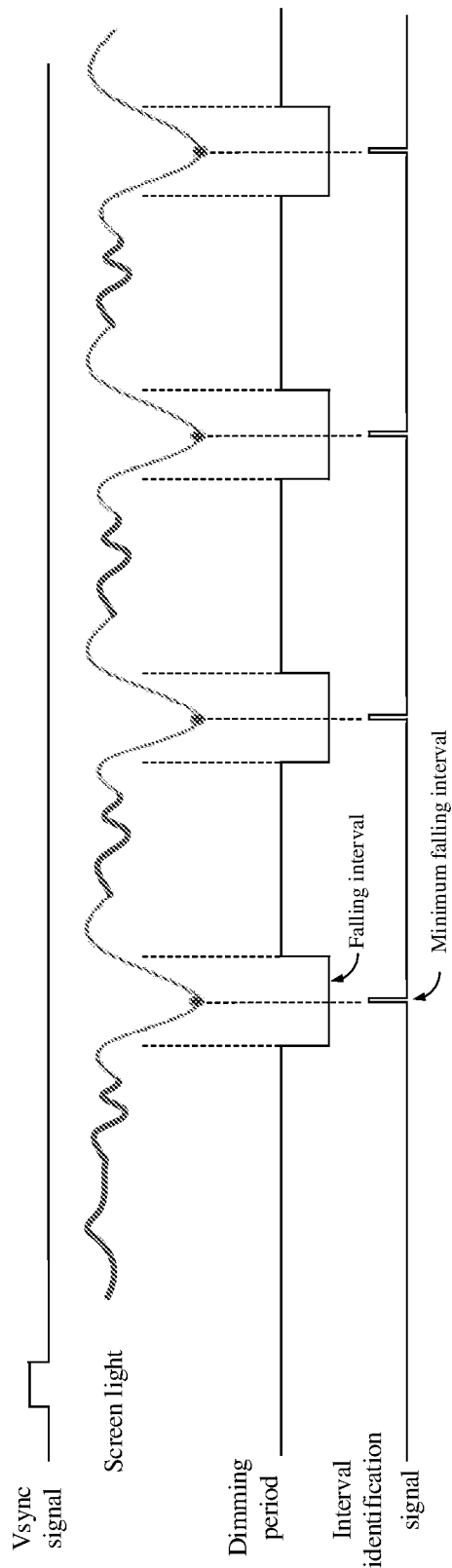
FIG. 4 is a schematic diagram of an interval identification signal according to an embodiment of the present applicant.

FIG. 4 shows an interval identification signal determined according to a dimming period of a display screen. The first line is a Vsync signal, that is, a vertical synchronizing signal for the display screen. The display screen emits screen light based on its dimming period, as shown in the second line. Through some methods, for example, in a dark room, that is, without ambient light, the screen light emitted from the display screen can be detected, and its change rule can be simulated to obtain a signal that can characterize its falling interval and non-falling interval, for example, a dimming period shown in the third line. By generating an interval identification signal shown in the fourth line, a time interval during which the signal amount of the screen light is minimum in the falling interval, that is, a position of a minimum falling interval, is identified.

Figure 5:
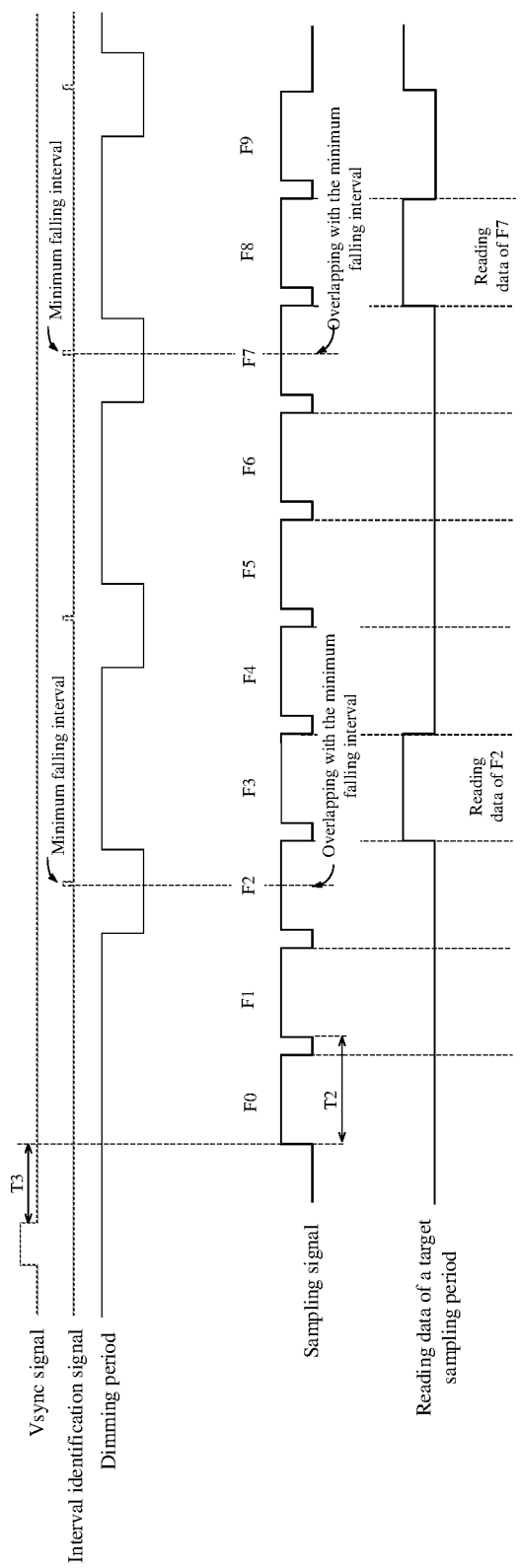
FIG. 5 is a schematic diagram of a detection time sequence of a specific implementation manner based on the method shown in FIG. 2.

As shown in FIG. 5, when data is collected, a sampling signal is output based on a sampling period T2, 10 sampling periods are shown in FIG. 5, and sampling time in respective sampling periods are sequentially denoted as F0 to F9. It can be seen that the sampling time F2 and the sampling time F7 each overlap with minimum falling intervals identified by an interval identification signal in time, which indicates that the data collected during the sampling time F2 and the sampling time F7 are corresponding data when the screen light of the display screen enters the minimum falling intervals. Since the signal amount of the screen light is minimum in a minimum falling interval, the data collected during the sampling time F2 and the sampling time F7 are closest to data of the actual ambient light, and thus the ambient light can be determined according to the data of the sampling time F2 and the sampling time F7.

When a start time of the sampling signal is slightly advanced or slightly delayed, the size of the data collected during the sampling time may be changed slightly. In order to collect data when the light leak from the screen is minimum, the start time of the sampling signal can be adjusted, so that the data collected in the target sampling period is minimum, and in this case, the influence of the interference of the light leak from the screen on the detection of the ambient light is minimum.

In an implementation manner, the method 100 further includes: adjusting a start time of the sampling signal according to data of a preceding sampling period of the target sampling period and data of a following sampling period of the target sampling period, to reduce the data of the target sampling period to a minimum.

For example, the data of the preceding sampling period and the data of the following sampling period can be read; when the data of the preceding sampling period is greater than the data of the following sampling period, the start time of the sampling signal is delayed according to a preset adjustment amount; and when the data of the following sampling period is greater than the data of the preceding sampling period, the start time of the sampling signal is advanced according to the adjustment amount.

In this way, through the sizes of data in the preceding sampling period and the following sampling period of the target sampling period, whether the start time of the sampling signal needs to be adjusted can be determined. When the data of the preceding sampling period is greater than the data of the following sampling period, the start time of the sampling signal can be delayed according to a certain adjustment amount, so that the target sampling period contains less data of the light leak from the screen; and when the data of the following sampling period is greater than the data of the preceding sampling period, the start time of the sampling signal can be advanced according to the adjustment amount, so that the target sampling period contains less data of the light leak from the screen.

The start time of the sampling period may be adjusted once or more times to make the data of the target sampling period as small as possible. The adjustment amount for each advance or delay can be calculated, for example, in the following way:

$$\Delta T = \{[(1/2) \times |Data\_Pre - Data\_Aft|]/(Data\_Pre + Data\_Aft)\} \times T.$$

$\Delta T$ is the adjustment amount, Data_Pre is the data of the preceding sampling period, Data_Aft is the data of the following sampling period, and T is sampling time in a sampling period or a preceding adjustment amount.

When multiple adjustments are made, the first adjustment amount for the first time $\Delta T1$ is:

$$\Delta T1 = \{[(1/2) \times |Data\_Pre\_1 - Data\_Aft\_1|]/(Data\_Pre\_1 + Data\_Aft\_1)\} \times T',$$

and T' is the sampling time;

the adjustment amount for the second time $\Delta T2$ is:

$$\Delta T2 = \{[(1/2) \times |Data\_Pre\_2 - Data\_Aft\_2|]/(Data\_Pre\_2 + Data\_Aft\_2)\} \times \Delta T1;$$

the adjustment amount for the third time $\Delta T3$ is:

$$\Delta T3 = \{[(1/2) \times |Data\_Pre\_3 - Data\_Aft\_3|]/(Data\_Pre\_3 + Data\_Aft\_3)\} \times \Delta T2;$$

. . . ; and the adjustment amount for the $N^{th}$ time $\Delta TN$ is:

$$\Delta TN = \{[(1/2) \times |Data\_Pre\_N - Data\_Aft\_N|]/(Data\_Pre\_N + Data\_Aft\_N)\} \times \Delta T(N-1).$$

After N adjustments, it can converge and end.

In another implementation manner, the method 100 further includes: adjusting a start time of the sampling signal according to a preset time step, to reduce the data of the target sampling period to a minimum.

In this embodiment, a start time of the sampling signal can be adjusted directly according to a preset time step, instead of relying on the data in the preceding sampling period and the following sampling period of the target sampling period, until the data of the target sampling period is minimum.

In an implementation manner, the method 100 further includes: monitoring frequency deviation of the display screen; reading a vertical synchronizing signal for the display screen when a degree of the frequency deviation is greater than a preset value; and adjusting a start time and/or a sampling period of the sampling signal according to the vertical synchronizing signal.

The display screen usually has frequency deviation, and when the frequency deviation occurs on the display screen, the position and width of the falling interval may be changed. Therefore, the start time, the sampling period and the like of the sampling signal need to be adjusted.

There is a fixed time delay between the start time of the sampling signal and a Vsync signal for the display screen, such as T3 shown in FIG. 5. The start time of the sampling signal can be determined according to the position of each Vsync signal.

When the degree of the frequency derivation of the display screen is greater than the preset value, the start time of the sampling signal is adjusted according to the position of the current Vsync signal; and/or the length of the sampling period is adjusted based on a time interval between two adjacent Vsync signals. For example, when the time interval between the two adjacent Vsync signals becomes smaller, the length of the sampling period is adjusted to reduce it correspondingly.

Therefore, by reading the Vsync signal for the display screen, the start time and the sampling period of the sampling signal can be adjusted based on the Vsync signal, to reduce the influence of the frequency deviation of the display screen on the detection of the ambient light.

In the embodiments of the present application, said Vsync signal may be directly output by the display screen; or it may be an analog signal obtained after simulating the Vsync signal output by the display screen; or the Vsync signal output by the display screen may be used in priority, and when the Vsync signal output by the display screen is lost, an analog signal for the Vsync signal is then used.

In an implementation manner, brightness of the screen light includes a plurality of brightness levels, and the plurality of brightness levels correspond to a plurality of interval identification signals, respectively. In this case, in step 110, an interval identification signal corresponding to a current brightness level of the display screen may be generated.

For example, the screen light of the display screen includes different brightness levels, such as brightness of 10%, brightness of 20%, brightness of 30%, . . . , brightness of 100%. For each brightness level, a corresponding interval identification signal is determined in advance. Then, an interval identification signal corresponding to a current brightness level of the display screen can be generated based on the current brightness level of the display screen. When the brightness level changes, the interval identification signal is replaced to match a brightness level after the change.

Similarly, for different color gray scales of the screen, corresponding interval identification signals may also be set. Then, an interval identification signal corresponding to a current gray scale of the display screen can be generated based on the current gray scale of the display screen.

A method for detecting ambient light provided in the present application is described above with reference to FIG. 2 and FIG. 5, and another method for detecting ambient light provided in the present application will be described hereinafter with reference to FIG. 6 and FIG. 7.

Figure 6:
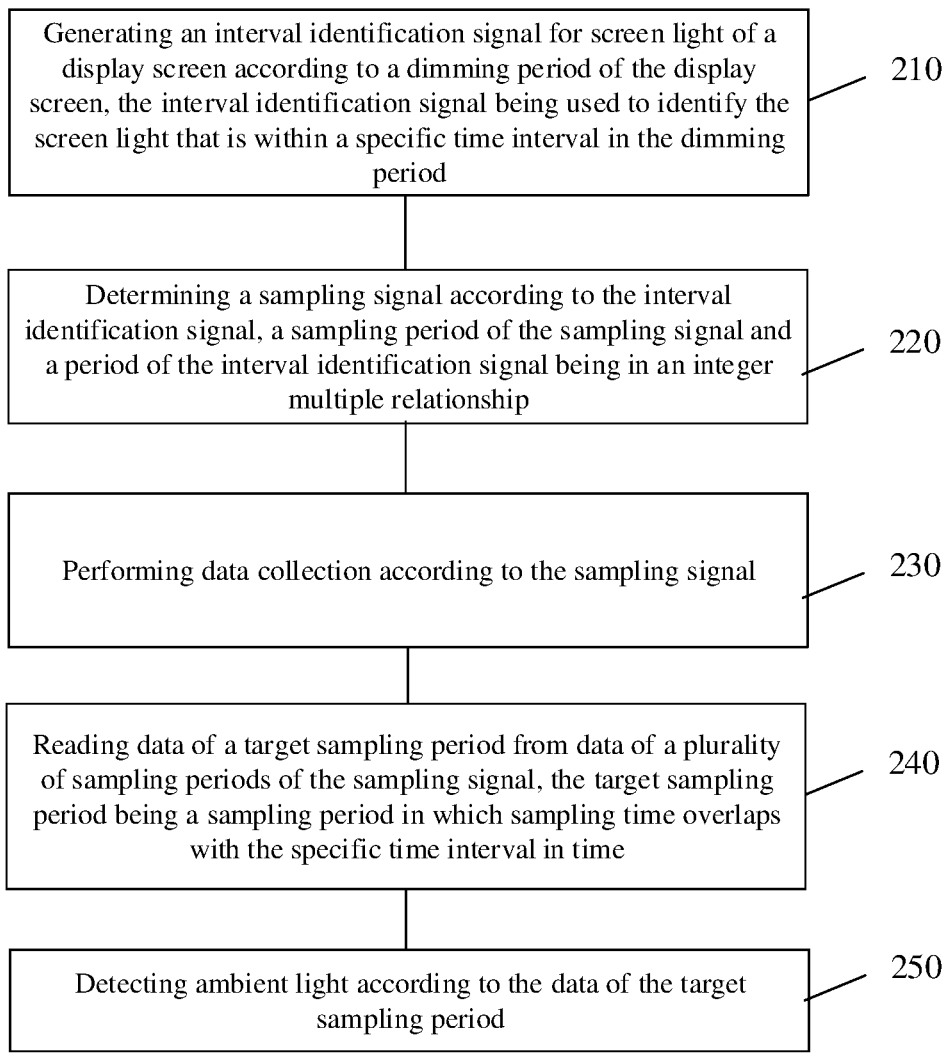
FIG. 6 is a schematic flowchart of a method for detecting ambient light according to another embodiment of the present application.

FIG. 6 shows a schematic flowchart of another method for detecting ambient light in an embodiment of the present application. As shown in FIG. 6, a method 200 for detecting ambient light includes some or all of the following steps.

In step 210, an interval identification signal for screen light of a display screen is generated according a dimming period of the display screen.

The interval identification signal is used to identify the screen light that is within a specific time interval in the dimming period. The interval identification signal can identify a time position of the specific time interval, and optionally, can identify information such as a size of the screen light within the specific time interval.

In step 220, a sampling signal is determined according to the interval identification signal. There is an integer multiple relationship between a sampling period of the sampling signal and a period of the interval identification signal.

In step 230, data collection is performed according to the sampling signal.

In step 240, data of a target sampling period is read from data of a plurality of sampling periods of the sampling signal.

The target sampling period is a sampling period in which sampling time overlaps with the specific time interval in time.

That is, when data is collected according to the sampling signal based on a preset sampling period and the sampling period just overlaps with the specific time interval identified by interval identification information in time, it means that the data of the sampling period is data corresponding to the specific time interval, and then the sampling period is a target sampling period. When data is read, the data of the target sampling period can be read out for detection of the ambient light. The term "overlap" here may refer to either full overlapping or partial overlapping.

In step 250, the ambient light is detected according to the data of the target sampling period.

In this embodiment, since there is an integer multiple relationship between the sampling period of the sampling signal and the period of the interval identification signal, in one dimming period, if a target sampling period overlaps with the specific time interval in time, then in another dimming period, the target sampling period also overlaps with the specific time interval in time.

Therefore, part of screen light of a display screen that is within a specific time interval in a dimming period of the display screen is identified through an interval identification signal, and thus a sampling signal is determined according to the interval identification signal, so that there is an integer multiple relationship between a sampling period of the sampling signal and a period of the interval identification signal. In this way, when data corresponding to one specific time interval can be collected, data corresponding to another specific time interval can also be collected, and thus data corresponding to each specific time interval can be fully utilized for detection of the ambient light.

It should be understood that there may be a small amount of screen light even in a falling interval, so as to affect the detection of the ambient light, that is, the data of the target sampling period is ambient light data that is least affected by the interference of a light leak from the screen. However, in some cases, for example, in a case of low brightness of the screen, the data of the target sampling period can be regarded as the data of the ambient light under a condition of an allowed error, so as to simplify the test process. For example, in step 250, the data of the target sampling period can be determined as data of the ambient light.

Figure 7:
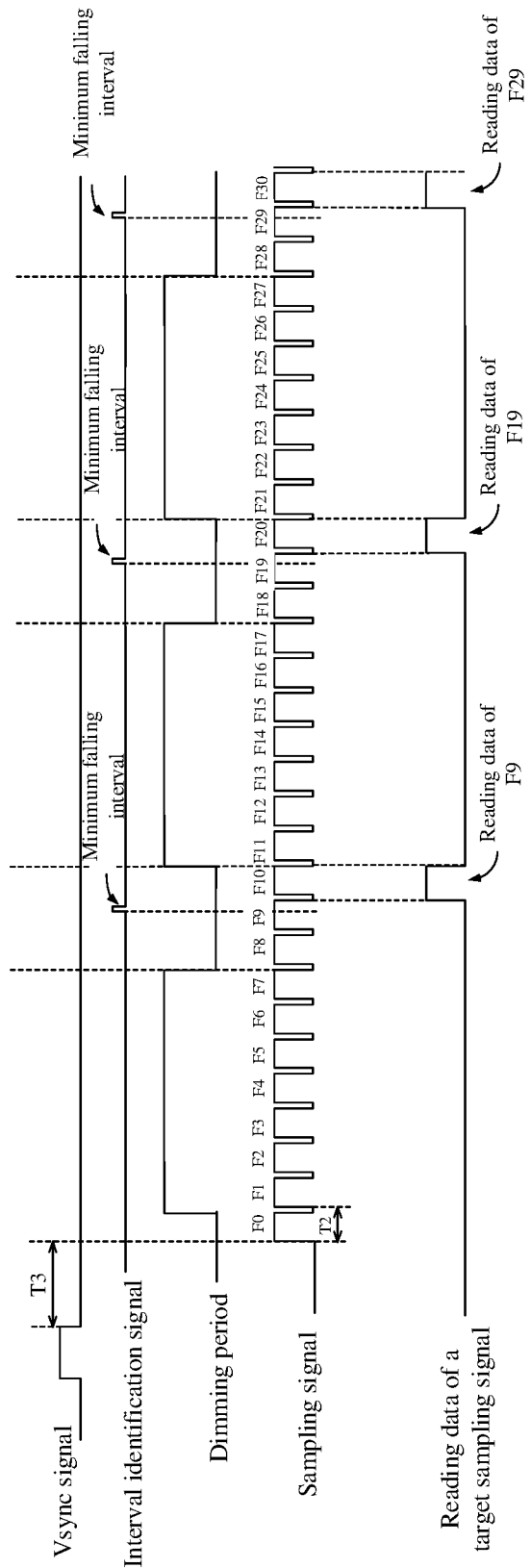
FIG. 7 is a schematic diagram of a detection time sequence of a specific implementation manner based on the method shown in FIG. 6.

As shown in FIG. 7, there is an integer multiple relationship between a sampling period and a period of an interval identification signal, or there is an integer multiple relationship between a sampling period and a dimming period. FIG. 7 shows an example that the period of the interval identification signal is 10 times the sampling period, that is, the frequency of the interval identification signal is $\frac{1}{10}$ of the sampling frequency. When data is collected, a sampling signal is output based on a sampling period T2. 31 sampling periods are shown in FIG. 7, and sampling time in respective sampling periods are sequentially denoted as F0 to F30. It can be seen that the sampling time F9, the sampling time F19, and the sampling time F29 each overlap with minimum falling intervals identified by an interval identification signal in time, which indicates that the data collected during the sampling time F9, the sampling time F19, and the sampling time F29 are corresponding data when the screen light of the display screen enters the minimum falling intervals. Since the light leak from the screen is minimum in the minimum falling intervals, the data collected during the sampling time F9, the sampling time F19, and the sampling time F29 are closest to data of the actual ambient light, and the ambient light can be detected according to the data of the sampling time F9, the sampling time F19, and the sampling time F29.

The sampling periods where the sampling time F9, the sampling time F19, and the sampling time F29 are located are distributed periodically. That is, when it is set that the relationship between the sampling period and the period of the interval identification signal is an integer multiple and it is ensured that sampling time of one sampling period, such as the sampling time F9, overlaps with a minimum falling interval identified by the interval identification signal in time, the sampling time F19, the sampling time F29 and the like periodically distributed correspondingly to the sampling time F9 can also overlap with minimum falling intervals in time. In this way, when the interval identification signal identifies minimum falling intervals, data corresponding to each minimum falling interval can be collected, and thus the data corresponding to each minimum falling interval is fully utilized to improve accuracy of detection of the ambient light.

Similarly, a start time of the sampling period may be adjusted through the foregoing methods, so that the data collected in the target sampling period is minimum.

In an implementation manner, a start time of the sampling signal may be adjusted according to data of a preceding sampling period of the target sampling period and data of a following sampling period of the target sampling period, to reduce the data of the target sampling period to a minimum.

For example, the data of the preceding sampling period and the data of the following sampling period can be read; when the data of the preceding sampling period is greater than the data of the following sampling period, the start time of the sampling signal is delayed according to a preset adjustment amount; and when the data of the following sampling period is greater than the data of the preceding sampling period, the start time of the sampling signal is advanced according to the adjustment amount.

In this way, through the sizes of data in the preceding sampling period and the following sampling period of the target sampling period, whether the start time of the sampling signal needs to be adjusted can be determined. When the data of the preceding sampling period is greater than the data of the following sampling period, the start time of the sampling signal can be delayed according to a certain adjustment amount, so that the target sampling period contains less data of the light leak from the screen; and when the data of the following sampling period is greater than the data of the preceding sampling period, the start time of the sampling signal can be advanced according to the adjustment amount, so that the target sampling period contains less data of the light leak from the screen.

The start time of the sampling period may be adjusted once or more times to make the data of the target sampling period as small as possible. The adjustment amount for each advance or delay can be calculated, for example, in the following way:

$$\Delta T = \{[(\tfrac{1}{2}) \times |\text{Data\_Pre} - \text{Data\_Aft}|]/(\text{Data\_Pre} + \text{Data\_Aft})\} \times T.$$

$\Delta T$ is the adjustment amount, Data_Pre is the data of the preceding sampling period, Data_Aft is the data of the following sampling period, and T is sampling time in a sampling period or a preceding adjustment amount. When multiple adjustments are made, reference can be made to the foregoing description for the specific adjustment manners.

In another implementation manner, the method 200 further includes: adjusting a start time of the sampling signal according to a preset time step, to reduce the data of the target sampling period to a minimum. That is, the start time of the sampling signal is adjusted directly according to a preset time step, instead of relying on the data in the preceding sampling period and the following sampling period, until the data of the target sampling period is minimum.

In an implementation manner, the method 200 further includes: monitoring frequency deviation of the display screen; reading a vertical synchronizing signal for the display screen when a degree of the frequency deviation is greater than a preset value; and adjusting a start time and/or a sampling period of the sampling signal according to the vertical synchronizing signal. Since there is a fixed time delay between the start time of the sampling signal and a Vsync signal for the display screen, by reading the Vsync signal for the display screen, the start time and the sampling period of the sampling signal can be adjusted based on the Vsync signal, to reduce the influence of the frequency deviation of the display screen on the detection of the ambient light.

In an implementation manner, brightness of the screen light includes a plurality of brightness levels, and the plurality of brightness levels correspond to a plurality of interval identification signals, respectively. In this case, in step 210, an interval identification signal corresponding to a current brightness level of the display screen may be generated.

Similarly, for different color gray scales of the screen, corresponding interval identification signals may also be set. Then, an interval identification signal corresponding to a current gray scale of the display screen can be generated based on the current gray scale of the display screen.

For the specific details in various implementation manners of the method 200, reference may be made to the foregoing description of the method 100, which will not be repeated redundantly herein for brevity.

It can be seen that, according to both the method 100 and the method 200, a specific time interval such as a minimum falling interval is identified by setting interval identification information, to obtain data collected in the specific time interval. In the method 100, it is not necessary to additionally configure the sampling period of the sampling signal and sampling time in each sampling period, and the data collected in the specific time interval can be automatically found, which has relatively small limitation on the sampling signal. In the method 200, the position of the target sampling period can be known in advance, the data in each specific time interval can be collected, and thus more data information can be obtained, which is beneficial to improvement of accuracy of detection of the ambient light.

Figure 8:
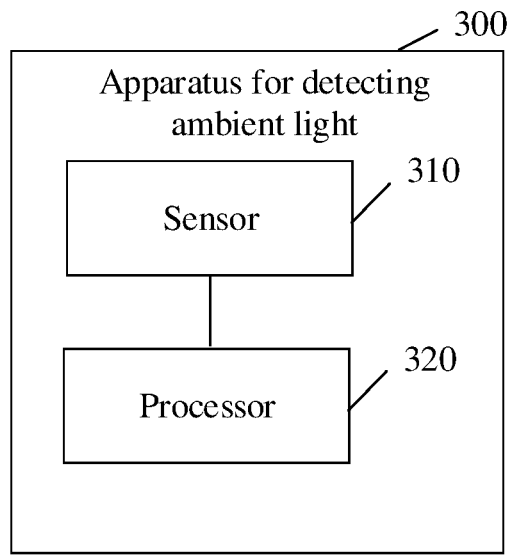
FIG. 8 is a schematic block diagram of an apparatus for detecting ambient light according to an embodiment of the present application.

The present application further provides an apparatus 300 for detecting ambient light under a display screen. As shown in FIG. 8, the apparatus 300 includes a sensor 310 and a processor 320. The processor 310 and the sensor 310 may be integrated on the same chip; or the processor 320 may be disposed separately from the sensor 310, for example, the processor 320 may be a processor in an electronic device, such as a main controller.

The sensor 310 is configured to perform data collection according to a sampling signal; and the processor 320 is configured to:

generate an interval identification signal for screen light of the display screen according to a dimming period of the display screen, the interval identification signal being used to identify the screen light that is within a specific time interval in the dimming period;

read data of a target sampling period from data of a plurality of sampling periods of the sampling signal according to the interval identification signal, the target sampling period being a sampling period in which sampling time overlaps with the specific time interval in time; and detect the ambient light according to the data of the target sampling period.

In this way, part of screen light of a display screen that is within a specific time interval in a dimming period of the display screen is identified through an interval identification signal, thus, a target sampling period in which data corresponding to the specific time interval can be collected is determined from a plurality of sampling periods, and the data of the target sampling period is read for detection of ambient light.

In an implementation manner, the dimming period includes a falling interval and a non-falling interval, and the specific time interval is a time interval during which a signal amount of the screen light is minimum within the falling interval.

In an implementation manner, the processor 320 is further configured to: adjust a start time of the sampling signal according to data of a preceding sampling period of the target sampling period and data of a following sampling period of the target sampling period, to reduce the data of the target sampling period to a minimum.

In an implementation manner, the processor 320 is specifically configured to: read the data of the preceding sampling period and the data of the following sampling period; delay the start time of the sampling signal according to a preset adjustment amount when the data of the preceding sampling period is greater than the data of the following sampling period; and advance the start time of the sampling signal according to the adjustment amount when the data of the following sampling period is greater than the data of the preceding sampling period.

In an implementation manner, the adjustment amount is:

$$\Delta T = \{[(\tfrac{1}{2}) \times |Data\_Pre - Data\_Aft|]/(Data\_Pre + Data\_Aft)\} \times T,$$

where $\Delta T$ is the adjustment amount, Data_Pre is the data of the preceding sampling period, Data_Aft is the data of the following sampling period, and T is sampling time in a sampling period.

In an implementation manner, the processor 320 is further configured to: adjust a start time of the sampling signal according to a preset time step, to reduce the data of the target sampling period to a minimum.

In an implementation manner, the processor 320 is further configured to: monitor frequency deviation of the display screen; read a vertical synchronizing signal for the display screen when a degree of the frequency deviation is greater than a preset value; and adjust a start time and/or a sampling period of the sampling signal according to the vertical synchronizing signal.

In an implementation manner, brightness of the screen light includes a plurality of brightness levels, and the processor 320 is specifically configured to: generate the interval identification signal corresponding to a current brightness level of the display screen.

It should be understood that, for the specific process of detecting the ambient light by the apparatus 300, reference may be made to the foregoing related description of the method 100, which will not be repeated redundantly herein for brevity.

Figure 9:
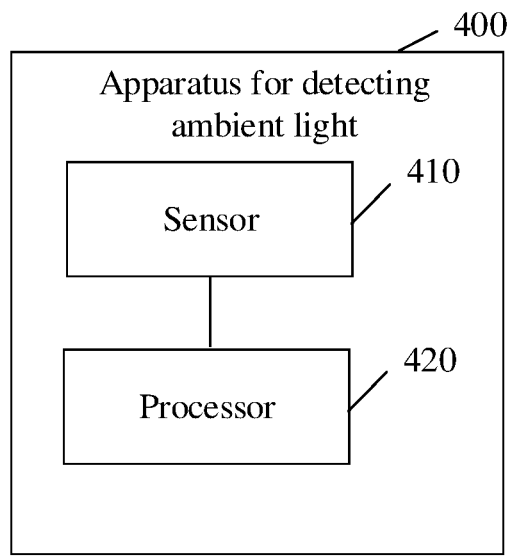
FIG. 9 is a schematic block diagram of an apparatus for detecting ambient light according to another embodiment of the present application.

The present application further provides an apparatus 400 for detecting ambient light under a display screen. As shown in FIG. 9, the apparatus 400 includes a sensor 410 and a processor 420. The processor 420 and the sensor 410 may be integrated on the same chip; or the processor 420 may be disposed separately from the sensor 410, for example, the processor 420 may be a processor in an electronic device, such as a main controller.

The sensor 410 is configured to perform data collection according to a sampling signal.

The processor 420 is configured to:

generate an interval identification signal for screen light of the display screen according to a dimming period of the display screen, the interval identification signal being used to identify the screen light that is within a specific time interval in the dimming period;

determine the sampling signal according to the interval identification signal, there is an integer multiple relationship between a sampling period of the sampling signal and a period of the interval identification signal;

read data of a target sampling period from data of a plurality of sampling periods of the sampling signal, the target sampling period being a sampling period in which sampling time overlaps with the specific time interval in time; and detect the ambient light according to the data of the target sampling period.

In this way, part of screen light of a display screen that is within a specific time interval in a dimming period of the display screen is identified through an interval identification signal, and thus a sampling signal is determined according to the interval identification signal, so that there is an integer multiple relationship between a sampling period of the sampling signal and a period of the interval identification signal. In this way, when data corresponding to one specific time interval can be collected, data corresponding to another specific time interval can also be collected, and thus data corresponding to each specific time interval can be fully utilized for detection of the ambient light.

In an implementation manner, the target sampling period is distributed periodically.

In an implementation manner, the dimming period includes a falling interval and a non-falling interval, and the specific time interval is a time interval during which a signal amount of the screen light is minimum within the falling interval.

In an implementation manner, the processor 420 is further configured to: adjust a start time of the sampling signal according to data of a preceding sampling period of the target sampling period and data of a following sampling period of the target sampling period, to reduce the data of the target sampling period to a minimum.

In an implementation manner, the processor 420 is specifically configured to: read the data of the preceding sampling period and the data of the following sampling period; delay the start time of the sampling signal according to a preset adjustment amount when the data of the preceding sampling period is greater than the data of the following sampling period; and advance the start time of the sampling signal according to the adjustment amount when the data of the following sampling period is greater than the data of the preceding sampling period.

In an implementation manner, the adjustment amount is:
$\Delta T = \{[(½) \times |Data\_Pre - Data\_Aft|]/(Data\_Pre + Data\_Aft)\} \times T$, where $\Delta T$ is the adjustment amount, Data_Pre is the data of the preceding sampling period, Data_Aft is the data of the following sampling period, and T is sampling time in a sampling period.

In an implementation manner, the processor 420 is further configured to: adjust a start time of the sampling signal according to a preset time step, to reduce the data of the target sampling period to a minimum.

In an implementation manner, the processor 420 is further configured to: monitor frequency deviation of the display screen; read a vertical synchronizing signal for the display screen when a degree of the frequency deviation is greater than a preset value; and adjust a start time and/or a sampling period of the sampling signal according to the vertical synchronizing signal.

In an implementation manner, brightness of the screen light includes a plurality of brightness levels, and the processor is specifically configured to: generate the interval identification signal corresponding to a current brightness level of the display screen.

It should be understood that, for the specific process of detecting the ambient light by the apparatus 400, reference may be made to the foregoing related description of the method 200, which will not be repeated redundantly herein for brevity.

The present application further provides an electronic device, which includes: a display screen; and the apparatus 300 for detecting ambient light under the display screen in the above any possible implementation manner.

The present application further provides an electronic device, which includes: a display screen; and the apparatus 400 for detecting ambient light under the display screen in the above any possible implementation manner.

It should be noted that, under a premise of no conflict, various embodiments and/or technical features in the various embodiments described in the present application may be combined with each other arbitrarily, and the technical solutions obtained after the combination should also fall within the protection scope of the present application.

In the system, apparatus, and method disclosed in the embodiments of the present application may be implemented in another manner. For example, some features of the method embodiments described above can be ignored or not implemented. The apparatus embodiments described above are merely exemplary. The division of the units is merely a logic function division, other division manners may exist in practical implementation. A plurality of units or components may be combined or integrated to another system. In addition, coupling between various units or coupling between various components may be direct coupling or indirect coupling, and the foregoing coupling includes a connection in electrical, mechanical or other forms.

A person skilled in the art may clearly understand that, for convenience and simplicity of description, the specific working processes and the achieved technical effects of the apparatus and the device described above may refer to corresponding processes and technical effects in the foregoing method embodiments, which will not be described redundantly herein.

It should be understood that the specific examples in the embodiments of the present application are only to help those skilled in the art to better understand the embodiments of the present application, but not to limit the scope of the embodiments of the present application. Various modifications and variations which fall within the protection scope of the present application can be made by those skilled in the art based on the foregoing embodiments.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A method for detecting ambient light under a display screen, wherein the method comprises:

generating an interval identification signal for screen light of the display screen according to a dimming period of the display screen, the interval identification signal being used to identify the screen light that is within a specific time interval in the dimming period;

performing data collection according to a sampling signal;

reading data of a target sampling period from data of a plurality of sampling periods of the sampling signal according to the interval identification signal, the target sampling period being a sampling period in which sampling time overlaps with the specific time interval in time; and detecting the ambient light according to the data of the target sampling period;

wherein brightness of the screen light comprises a plurality of brightness levels, the plurality of brightness levels correspond to a plurality of interval identification signals, respectively, and the generating the interval identification signal for the screen light of the display screen, comprises:

generating the interval identification signal corresponding to a current brightness level of the display screen.

2. The method according to claim 1, wherein the dimming period comprises a falling interval and a non-falling interval, and the specific time interval is a time interval during which a signal amount of the screen light is minimum within the falling interval.

3. The method according to claim 2, wherein the method further comprises:
adjusting a start time of the sampling signal according to data of a preceding sampling period of the target sampling period and data of a following sampling period of the target sampling period, to reduce the data of the target sampling period to a minimum.

4. The method according to claim 3, wherein the adjusting the start time of the sampling signal according to the data of the preceding sampling period of the target sampling period and the data of the following sampling period of the target sampling period, comprises:
reading the data of the preceding sampling period and the data of the following sampling period;
delaying the start time of the sampling signal according to a preset adjustment amount when the data of the preceding sampling period is greater than the data of the following sampling period; and
advancing the start time of the sampling signal according to the adjustment amount when the data of the following sampling period is greater than the data of the preceding sampling period.

5. The method according to claim 4, wherein the adjustment amount is:

$$\Delta T=\{[(\tfrac{1}{2})\times|\text{Data\_Pre}-\text{Data\_Aft}|]/(\text{Data\_Pre}+\text{Data\_Aft})\}\times T,$$

wherein $\Delta T$ is the adjustment amount, Data_Pre is the data of the preceding sampling period, Data_Aft is the data of the following sampling period, and T is sampling time in a sampling period or a preceding adjustment amount.

6. The method according to claim 2, wherein the method further comprises:
adjusting a start time of the sampling signal according to a preset time step, to reduce the data of the target sampling period to a minimum.

7. The method according to claim 1, wherein the method further comprises:
monitoring frequency deviation of the display screen;
reading a vertical synchronizing signal for the display screen when a degree of the frequency deviation is greater than a preset value; and
adjusting a start time and/or a sampling period of the sampling signal according to the vertical synchronizing signal.

8. A method for detecting ambient light under a display screen, wherein the method comprises:
generating an interval identification signal for screen light of the display screen according to a dimming period of the display screen, the interval identification signal being used to identify the screen light that is within a specific time interval in the dimming period;
determining a sampling signal according to the interval identification signal, there is an integer multiple relationship between a sampling period of the sampling signal and a period of the interval identification signal;
performing data collection according to the sampling signal;
reading data of a target sampling period from data of a plurality of sampling periods of the sampling signal, the target sampling period being a sampling period in which sampling time overlaps with the specific time interval in time; and
detecting the ambient light according to the data of the target sampling period;

wherein brightness of the screen light comprises a plurality of brightness levels, the plurality of brightness levels correspond to a plurality of interval identification signals, respectively, and the generating the interval identification signal for the screen light of the display screen, comprises:
generating the interval identification signal corresponding to a current brightness level of the display screen.

9. The method according to claim 8, wherein the target sampling period is distributed periodically.

10. The method according to claim 8, wherein the dimming period comprises a falling interval and a non-falling interval, and the specific time interval is a time interval during which a signal amount of the screen light is minimum within the falling interval.

11. The method according to claim 10, wherein the method further comprises:
adjusting a start time of the sampling signal according to data of a preceding sampling period of the target sampling period and data of a following sampling period of the target sampling period, to reduce the data of the target sampling period to a minimum.

12. The method according to claim 11, wherein the adjusting the start time of the sampling signal according to the data of the preceding sampling period of the target sampling period and the data of the following sampling period of the target sampling period, comprises:
reading the data of the preceding sampling period and the data of the following sampling period;
delaying the start time of the sampling signal according to a preset adjustment amount when the data of the preceding sampling period is greater than the data of the following sampling period; and
advancing the start time of the sampling signal according to the adjustment amount when the data of the following sampling period is greater than the data of the preceding sampling period.

13. The method according to claim 12, wherein the adjustment amount is:

$$\Delta T=\{[(\tfrac{1}{2})\times|\text{Data\_Pre}-\text{Data\_Aft}|]/(\text{Data\_Pre}+\text{Data\_Aft})\}\times T,$$

wherein $\Delta T$ is the adjustment amount, Data_Pre is the data of the preceding sampling period, Data_Aft is the data of the following sampling period, and T is sampling time in a sampling period or a preceding adjustment amount.

14. The method according to claim 10, wherein the method further comprises:
adjusting a start time of the sampling signal according to a preset time step, to reduce the data of the target sampling period to a minimum.

15. The method according to claim 8, wherein the method further comprises:
monitoring frequency deviation of the display screen;
reading a vertical synchronizing signal for the display screen when a degree of the frequency deviation is greater than a preset value; and
adjusting a start time and/or a sampling period of the sampling signal according to the vertical synchronizing signal.

16. An apparatus for detecting ambient light under a display screen, wherein the apparatus comprises:
a sensor, configured to perform data collection according to a sampling signal; and a processor, configured to:
generate an interval identification signal for screen light of the display screen according to a dimming period of the display screen, the interval identification signal being used to identify part of the screen light that is within a specific time interval in the dimming period;
read data of a target sampling period from data of a plurality of sampling periods of the sampling signal according to the interval identification signal, the target sampling period being a sampling period in which sampling time overlaps with the specific time interval in time; and
detect the ambient light according to the data of the target sampling period;
wherein brightness of the screen light comprises a plurality of brightness levels, the plurality of brightness levels correspond to a plurality of interval identification signals, respectively, and the generating the interval identification signal for the screen light of the display screen, comprises:
generating the interval identification signal corresponding to a current brightness level of the display screen.

17. The apparatus according to claim 16, wherein the dimming period comprises a falling interval and a non-falling interval, and the specific time interval is a time interval during which a signal amount of the screen light is minimum within the falling interval.

\* \* \* \* \*